Dec. 16, 1952 G. G. LEWIS ET AL 2,621,521
POWER TRANSMISSION
Filed July 25, 1950 2 SHEETS—SHEET 1

INVENTORS
RAY C. CONNER
GEORGE G. LEWIS
BY
Ralph L. Tweedale
ATTORNEY

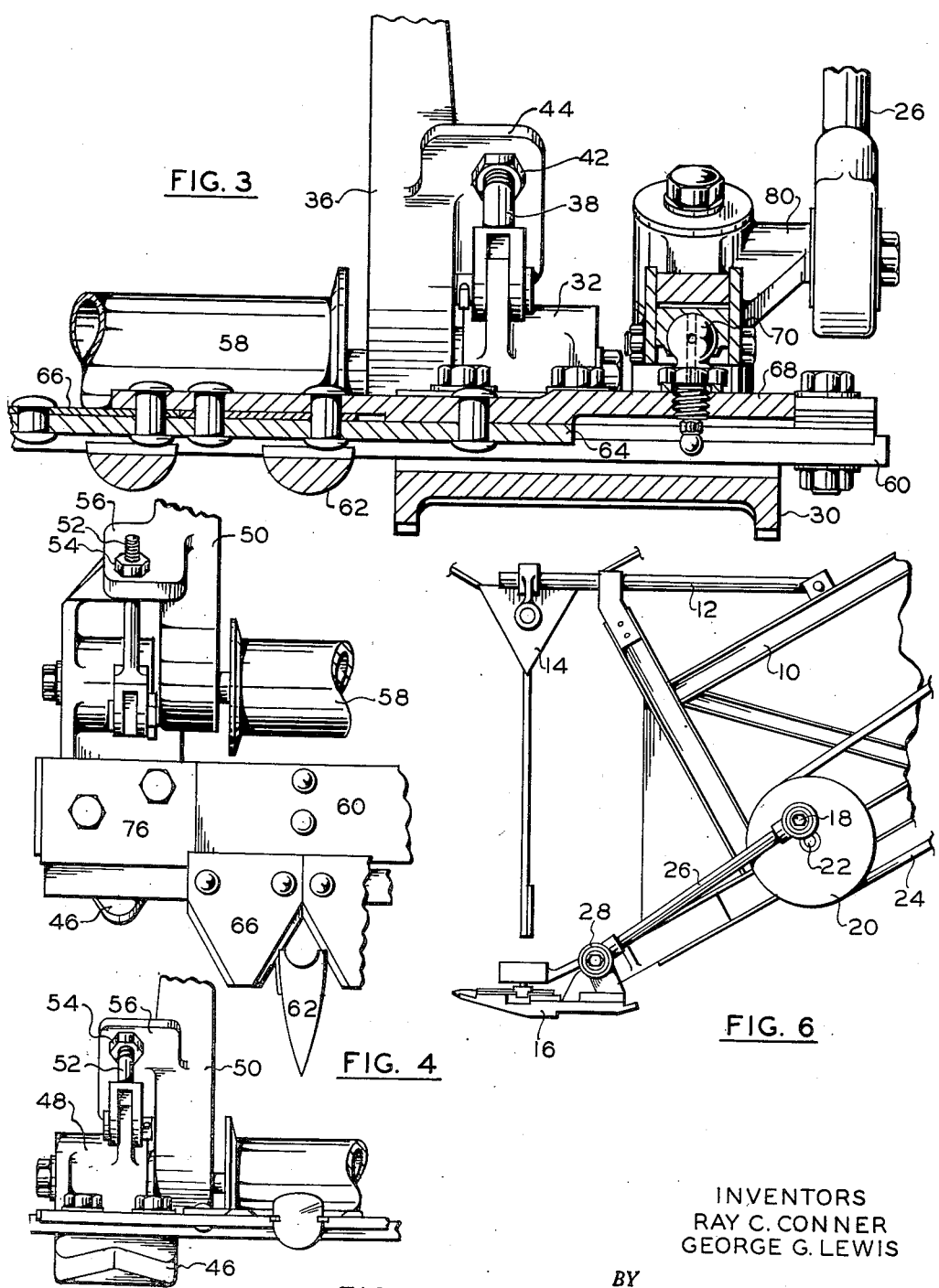

Patented Dec. 16, 1952

2,621,521

UNITED STATES PATENT OFFICE 2,621,521

POWER TRANSMISSION

George G. Lewis and Ray C. Conner, Detroit, Mich., assignors to Vickers Incorporated, Detroit, Mich., a corporation of Michigan Application July 25, 1950, Serial No. 175,773

5 Claims. (Cl. 74—40)

This invention relates to power transmissions and more particularly to an improved mechanism for transmitting power to drive the sickle bar of a mower.

It is an object of the present invention to provide a simple, rugged mechanism for operating a sickle bar and particularly one which is mounted near the front of an implement, for example, a forage harvester or combine and which is of the type requiring that power be delivered to it from a crank located rearwardly of the sickle bar and rotating on an axis parallel to the sickle bar.

Many mower drives of this class use a bell crank near the sickle bar which converts fore and aft reciprocating motion of a drive link into transverse reciprocating motion of the sickle bar. Drives heretofore used in this class of service have been deficient in several respects and particularly have been short-lived under rugged field service conditions.

It is an object of the present invention to provide an improved mower drive mechanism which will be simple, yet rugged, having a minimum of parts, and which will operate satisfactorily over a long service life.

It is a further object of the invention to provide a drive of this class which is easily serviced and which when parts become worn may be easily repaired and restored to serviceable condition.

Another deficiency of prior sickle bar drives of this class and one which contributes to their short service life is excessive vibration. Attempts to reduce the effects of vibration have heretofore involved the use of counterbalance weights and similar measures. One common expedient is to provide a counterbalance attached to or formed as an integral part of the bell crank. In accordance with the present invention, vibration is greatly reduced and the necessity of counterweights at the bell crank is completely eliminated.

Further objects and advantages of the present invention will be apparent from the following description, reference being had to the accompanying drawings wherein a preferred form of the present invention is clearly shown.

In the drawings:

Figure 3 is a section on line 3—3 of Figure 1.

Figure 4 is a fragmentary top view of the opposite end of the sickle bar shown in Figure 1.

Figure 5 is a front view of the portion of the mechanism shown in Figure 4.

Figure 6 is a side view on a smaller scale showing the front portion of a reaper combine or other harvester incorporating the drive mechanism of the present invention.

Figure 1:
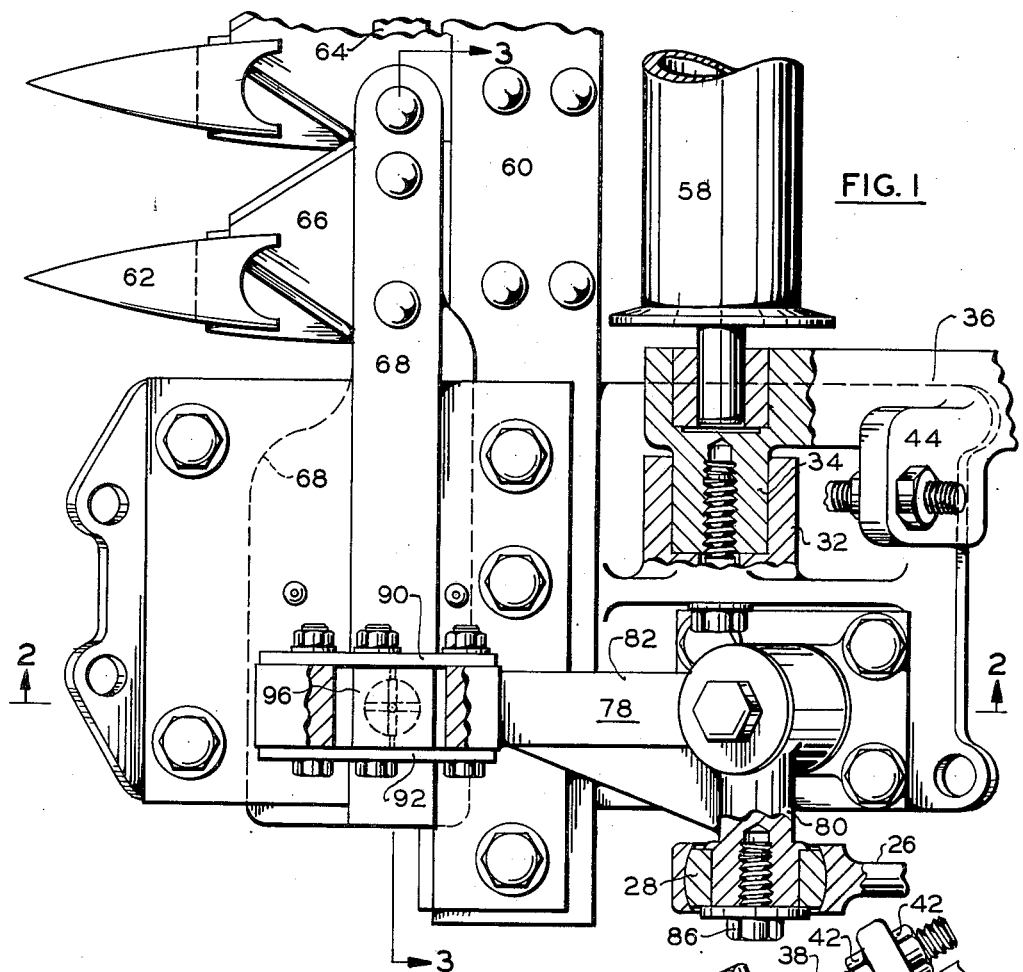
Figure 1 is a top view partly in section showing the driving end of a mower mechanism incorporating a preferred form of the present invention.
Figure 2:
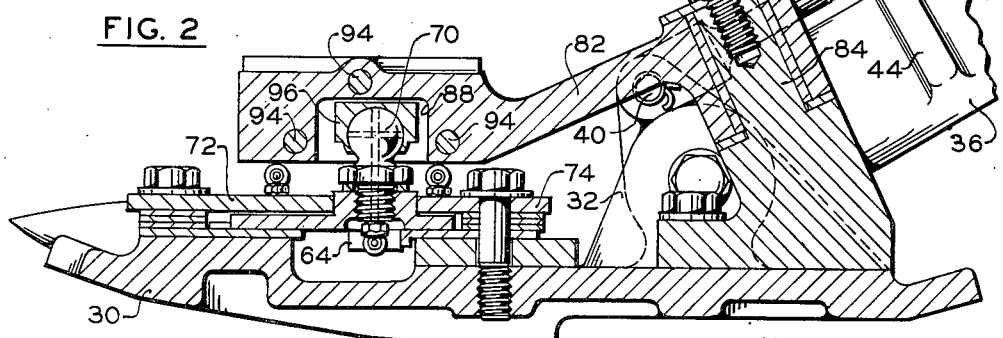
Figure 2 is a section on line 2—2 of Figure 1.

Referring now to Figure 6, a frame 10 carries at its upper end, on a bracket 12, a reel 14 which is positioned above a mower generally designated 16. The latter is secured to the lower front portion of the frame 10 and is adapted to be driven from a crank 18 carried by a pulley 20 mounted on a transverse shaft 22. The pulley 20 is driven by a belt 24 from any suitable source of power. A connecting rod or link 26 is journalled on the crank 18 and at its forward end has a ball and socket type bearing 28.

The mower comprises a shoe plate 30 having an upstanding ear 32 which forms a bearing by which the shoe may be pivoted on a stud 34 formed on a frame member 36. A threaded clevis link 38 is pivoted at 40 to the upper portion of the ear 32 and carries jam nuts 42 on either side of a stationary ear 44 formed on the frame member 36. By adjusting the position of the nuts 42, the angular position of the shoe 30 relative to the frame member 36 may be adjusted.

At its opposite end the mower has a similar shoe 46 having an ear 48 forming a pivot journal on the frame member 50. A similar clevis link 52 has jam nuts 54 on each side of an ear 56 for corresponding adjustment. The axis of pivot 34 and its corresponding pivot in the ear 48 at the opposite side preferably coincide with the bearing axis of a conveyer roller 58 which is also journalled on the frame members 36 and 50.

Secured to the shoes 30 and 46 is a conventional finger bar 60 having the usual fingers 62 secured thereto and which forms a guide for the sickle bar 64 carrying the usual knives 66. The sickle bar 64 carries at its left-hand end an extension 68 which carries a ball stud 70. Suitable hold-down plates 72, 74, and 76 are bolted to the shoes 30 and 46, respectively.

For the purpose of transferring reciprocating motion from the link 26 to the ball stud 70, there is provided a bell crank 78 having arms 80 and 82. The bell crank is pivoted on a stationary pivot pin 84 secured to the shoe 30. The pivot 84 lies in a vertical plane substantially parallel to the path of travel of the mower and is inclined forwardly at its top so as to be perpendicularly offset to the axis of link 26 when the axis of link 26 and the radius arm of crank 18 are coplanar. The ball joint 28 is secured to the arm 80 by suitable washer studs 86.

The arm 82 in its mid-position extends forwardly over the ball stud 70 and has a recess 88 which is closed at its top as well as at its forward and rear ends. Secured to the sides of the arm 82 are a pair of plates 90 and 92 secured thereto by bolts 94. The ball stud 70 carries a bearing block 96 which is swaged on the same and which has flat sides bearing against the plates 90 and 92. The recess 88 has considerable clearance above and forwardly and rearwardly of the bearing block 96 to allow for the necessary relative movement to take care of the difference between the arcuate path of the recess 88 and the rectilinear path of the ball stud 70.

In operation, the angle on the mowing bar with respect to the ground is adjusted by proper setting of the jam nuts 42 and 54 so that the plane of the sickle bar is approximately horizontal. Upon rotation of the crank pulley 20, the link 26 is reciprocated which in turn causes the bell crank 78 to oscillate about its pivot 84. This motion is transferred to the ball stud 70 which reciprocates the sickle bar 64. It will be seen that the ball and socket joint 28 allows for the necessary changes in angularity of the crank arm 80 with respect to link 26. These changes are minimized by the location of pivot 84 in a direction substantially perpendicular to the link 26.

Transfer of motion from arm 82 to the sickle bar is through the ball stud 70 and its associated bearing block 96. It will be seen that the motion of the top wall of the recess 88 is such that it remains tangent to a cone whose axis is coincident with the axis of the pivot pin 84. The motion of the ball stud 70, however, is purely rectilinear. The difference between these two paths of travel is taken up by sliding motion of the bearing block 96 on the side plates 90 and 92. These plates, however, do not remain vertical except in the mid-position illustrated. They become inclined clockwise and counterclockwise from the position illustrated in Figure 3 and this action is taken up by rotation of the bearing block 96 on the ball stud 70. The same is true of the rotational movement when viewed from the top as in Figure 1.

By locating the pivot for the bell crank in the vertical plane and perpendicular to the mid-position of the connecting rod link, the vertical components of force acting on the bell crank and its pivot and tending to cause vibration are substantially eliminated. As a matter of fact in actual practice, the sickle bar drive herein disclosed has been found to be less subject to vibration than similar drives of the same size using counterweights but not having the bell crank pivot axis as shown. Another advantage in the present construction lies in the wide latitude permissible for dimensional variations due to accumulated tolerances. Thus the particular joint between the ball stud 70 and the arm 82 does not require close alignment between these two members either in a fore and aft direction or in a vertical direction.

It will thus be seen that the present invention provides an improved construction composed of simple rugged parts for transferring reciprocating drive motion to a mowing machine. The number of mechanical joints has been reduced to a minimum and such joints as are utilized are of simple rugged construction adequate to perform the duties encountered in rugged field service.

While the form of embodiment of the invention as herein disclosed constitutes a preferred form, it is to be understood that other forms might be adopted, all coming within the scope of the claims which follow.

What is claimed is as follows:

1. A reciprocating drive mechanism for a sickle bar of a mower comprising in combination, a link and means for reciprocating the link substantially in a vertical plane parallel to the path of travel of the mower, a stationary pivot perpendicularly offset to the link, a bell crank journalled on the pivot and having one arm connected to the link and the other arm overlying the sickle bar, means forming a slot in said other arm, open only toward the bottom, a ball stud secured to the sickle bar and projecting into said slot and a bearing block pivoted on the ball stud and having its sides slidably engaging the sides of said slot.

2. A reciprocating drive mechanism for a sickle bar of a mower comprising in combination, a link and means for reciprocating the link substantially in a vertical plane parallel to the path of travel of the mower, a stationary pivot perpendicularly offset to the link, a bell crank journalled on the pivot and having one arm connected to the link by a ball and socket joint and the other arm overlying the sickle bar, means forming a slot in said other arm, open only toward the bottom, a ball stud secured to the sickle bar and projecting into said slot and a bearing block pivoted on the ball stud and having its sides slidably engaging the sides of said slot.

3. A reciprocating drive mechanism for a sickle bar of a mower comprising in combination, a link and means for reciprocating the link substantially in a vertical plane parallel to the path of travel of the mower, a stationary pivot inclined from vertical position so as to be perpendicularly offset to the link, a bell crank journalled on the pivot and having one arm connected to the link and the other arm overlying the sickle bar, means forming a slot in said other arm, open only toward the bottom, a ball stud secured to the sickle bar and projecting into said slot and a bearing block pivoted on the ball stud and having its sides slidably engaging the sides of said slot.

4. A reciprocating drive mechanism for a sickle bar of a mower comprising in combination, a link and means for reciprocating the link substantially in a vertical plane parallel to the path of travel of the mower, a stationary pivot perpendicularly offset to the link, a bell crank journalled on the pivot and having one arm connected to the link and the other arm overlying the sickle bar, means forming a slot in said other arm, having a top and front and rear walls, means forming removable plates closing the sides of said slot, a ball stud secured to the sickle bar and projecting into said slot and a bearing block pivoted on the ball stud and having its sides slidably engaging the plates closing the sides of said slot.

5. A reciprocating drive mechanism for a sickle bar of a mower comprising in combination, a link and means for reciprocating the link substantially in a vertical plane parallel to the path of travel of the mower, a stationary pivot inclined from vertical position so as to be perpendicularly offset to the link, a bell crank journalled on the pivot and having one arm connected to the link and the other arm overlying the sickle bar, means forming a slot in said other arm, having a top and front and rear walls, means forming removable plates closing the sides of said slot, a ball stud secured to the sickle bar and projecting into said slot and a bearing block pivoted on the ball stud and having its sides slidably engaging the plates closing the sides of said slot, the top of said slot being parallel to the sickle bar in mid-position and describing a conical path on each side of mid-position.

GEORGE G. LEWIS.
RAY C. CONNER.

REFERENCES CITED

The following references are of record in the file of this patent:

UNITED STATES PATENTS

| Number | Name | Date |
| --- | --- | --- |
| 325,950 | Markham | Sept. 8, 1885 |
| 920,000 | Anderson et al. | Apr. 27, 1909 |
| 1,528,745 | Lutes | Mar. 3, 1925 |